(12) United States Patent
Ur

(10) Patent No.: US 9,769,311 B2
(45) Date of Patent: *Sep. 19, 2017

(54) PRESENCE-BASED DEVICE MODE MODIFICATION

(71) Applicant: EMPIRE TECHNOLOGY DEVELOPMENT LLC, Wilmington, DE (US)

(72) Inventor: Shmuel Ur, Galil (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,773

(22) Filed: Apr. 7, 2016

(65) Prior Publication Data

US 2016/0219144 A1 Jul. 28, 2016

Related U.S. Application Data

(63) Continuation of application No. 14/382,662, filed as application No. PCT/US2014/018590 on Feb. 26, 2014, now Pat. No. 9,338,761.

(51) Int. Cl.
| | |
|---|---|
| H04M 1/00 | (2006.01) |
| H04M 3/42 | (2006.01) |
| H04W 68/00 | (2009.01) |
| H04M 1/725 | (2006.01) |
| H04M 19/04 | (2006.01) |
| H04W 4/00 | (2009.01) |
| H04W 4/02 | (2009.01) |
| H04W 8/00 | (2009.01) |

(52) U.S. Cl.
CPC ......... *H04M 3/42* (2013.01); *H04M 1/72563* (2013.01); *H04M 19/04* (2013.01); *H04W 4/001* (2013.01); *H04W 4/023* (2013.01); *H04W 8/005* (2013.01); *H04W 68/005* (2013.01); *H04M 1/7253* (2013.01); *H04M 1/72547* (2013.01); *H04M 2250/12* (2013.01)

(58) Field of Classification Search
CPC .................................................... H04M 3/42
USPC ..................................................... 455/550.1
See application file for complete search history.

(56) References Cited

U.S. PATENT DOCUMENTS 5,255,341 A * 10/1993 Nakajima ............... B66B 1/468
340/573.1
6,968,179 B1 * 11/2005 De Vries ............. H04L 12/5895
455/414.1

(Continued)

FOREIGN PATENT DOCUMENTS

WO 2012064651 A2 5/2012

OTHER PUBLICATIONS

"Locale," accessed at http://web.archive.org/web/20131214220748/ http://www.twofortyfouram.com/product, accessed on Apr. 5, 2016, pp. 1-3.

(Continued)

*Primary Examiner* — Santiago Garcia
(74) *Attorney, Agent, or Firm* — Brundidge & Stanger, P.C.

(57) ABSTRACT

In some examples, a first device may detect the presence of a second device or a particular person and, when a triggering event related to the second device or the particular person applies, the first device may change from a first mode to a second mode.

19 Claims, 4 Drawing Sheets

(56) References Cited

U.S. PATENT DOCUMENTS

| | | | |
|---|---|---|---|
| 7,439,872 B2 | 10/2008 | Hiltunen | |
| 9,020,443 B1* | 4/2015 | Tyler | H04B 17/318 |
| | | | 455/115.4 |
| 2004/0185915 A1 | 9/2004 | Ihara et al. | |
| 2007/0204410 A1 | 9/2007 | Siemensmeyer et al. | |
| 2007/0298791 A1 | 12/2007 | Waung | |
| 2008/0214161 A1 | 9/2008 | Jakl | |
| 2009/0018828 A1* | 1/2009 | Nakadai | G10L 15/20 |
| | | | 704/234 |
| 2009/0204410 A1* | 8/2009 | Mozer | G10L 15/30 |
| | | | 704/275 |
| 2009/0298511 A1* | 12/2009 | Paulson | H04M 1/72572 |
| | | | 455/456.1 |
| 2010/0063880 A1 | 3/2010 | Atsmon et al. | |
| 2011/0041140 A1 | 2/2011 | Harm et al. | |
| 2011/0154447 A1* | 6/2011 | Dennis | G06F 21/35 |
| | | | 726/4 |
| 2013/0006749 A1* | 1/2013 | Fink | G06Q 30/0207 |
| | | | 705/14.39 |
| 2013/0217331 A1 | 8/2013 | Manente | |
| 2013/0231138 A1* | 9/2013 | Hans | G06Q 30/02 |
| | | | 455/456.3 |
| 2013/0231929 A1* | 9/2013 | Komeji | G10L 15/20 |
| | | | 704/233 |
| 2013/0304278 A1 | 11/2013 | Chen | |
| 2014/0011515 A1* | 1/2014 | Fraccaroli | G06Q 30/00 |
| | | | 455/456.1 |
| 2014/0120906 A1* | 5/2014 | Luo | H04M 1/7253 |
| | | | 455/426.1 |
| 2014/0165091 A1* | 6/2014 | Abhyanker | G06Q 30/02 |
| | | | 725/27 |
| 2014/0207375 A1* | 7/2014 | Lerenc | H04W 4/02 |
| | | | 701/527 |
| 2014/0222534 A1* | 8/2014 | Abhyanker | G06Q 10/087 |
| | | | 705/14.23 |
| 2014/0228060 A1* | 8/2014 | Abhyanker | G06Q 10/087 |
| | | | 455/457 |
| 2014/0303983 A1* | 10/2014 | Bapat | G06F 21/44 |
| | | | 704/273 |
| 2015/0012268 A1* | 1/2015 | Nakadai | G10L 15/20 |
| | | | 704/233 |
| 2015/0024784 A1* | 1/2015 | Bellver | G06F 17/3087 |
| | | | 455/456.3 |
| 2015/0109193 A1* | 4/2015 | Sly | G06K 9/00892 |
| | | | 345/156 |
| 2015/0206329 A1* | 7/2015 | Devries | G06T 11/00 |
| | | | 345/633 |

OTHER PUBLICATIONS

"Set Phone Profiles based on Location & Automate Tasks & Settings on Android," accessed at http://web.archive.org/web/20130617105701/http://androidadvices.com/set-phone-profiles-based-location-automate-tasks-settings-android, accessed on Apr. 5, 2016, pp. 1-10.

"Speaker recognition," accessed at http://web.archive.org/web/20131214070535/http://en.wikipedia.org/wiki/Speaker_recognition, Last modified on Oct. 12, 2013, pp. 1-5.

"Tasker," accessed at http://web.archive.org/web/20140111062806/http://tasker.dinglisch.net/, accessed on Apr. 5, 2016, pp. 2.

International Search Report and Written Opinion for International Application No. PCT/US2014/018590, mailed on Jun. 26, 2014.

Mobile-Tech, "Smartphone Proximity Dating," accessed at https://web.archive.org/web/20130622054706/http://mobiledating.org/smartphone-proximity-dating/, posted on Mar. 28, 2010, pp. 3.

Perry, M. and Umashangar, C., "Proximity-Sensitive Messaging," accessed at http://www.brunel.ac.uk/~cssrmjp/homefiles/selected-publications/proximity-sensitive.pdf, accessed on Apr. 5, 2016, pp. 19.

* cited by examiner

PRESENCE-BASED DEVICE MODE MODIFICATION

CROSS-REFERENCE TO RELATED APPLICATIONS

This application is a Continuation under 35 U.S.C. § 120 of U.S. application Ser. No. 14/382,662, filed on Sep. 3, 2014, now U.S. Pat. No. 9,338,761, which is a U.S. National Stage filing under 35 U.S.C. § 371 of International Application No. PCT/US14/18590, filed on Feb. 26, 2017. The disclosures of both U.S. application Ser. No. 14/382,662 and International Application No. PCT/US14/18590 are hereby incorporated by reference in their entireties.

TECHNICAL FIELD

The described technology pertains generally to presence-based mode modification in for a client device.

BACKGROUND

Unless otherwise indicated herein, the approaches described in this section are not prior art to the claims in this application and are not admitted to be prior art by inclusion in this section.

Smartphone addiction is redefining or, at the very least, significantly altering societal norms. For instance, many smartphone users instinctively reply instantly to text messages and emails, regardless of their current location or circumstance. Consequently, more and more, smartphone users fail to truly engage in live, person-to-person conversations; instead paying more attention to their phones for ringtones or vibrating alerts that indicate the arrival of a new message. Such users often feel compelled to reply to a newly arrived message, even in the absence of genuine urgency.

SUMMARY

In one example embodiment, a non-transitory computer-readable medium, hosted on a first device, may store one or more executable instructions that, when executed, cause one or more processors to: determine a distance between the first device and a second device based on presence information of the second device; determine whether a triggering event applies based on the distance between the first device and the second device to activate a notification mode change of the first device; and, responsive to a determination that the triggering event applies, change a notification mode for the first device from a first mode to a second mode.

In another example embodiment, another non-transitory computer-readable medium, hosted on a first device, may store one or more executable instructions that, when executed, cause one or more processors to: determine a distance between the first device and a predetermined person based on presence information of the predetermined person; determine whether a triggering event applies based on the distance between the first device and the predetermined person to activate a notification mode change for the first device; and, responsive to a determination that the triggering event applies, change a notification mode for the first device from a first mode to a second mode.

In yet another example embodiment, a first device may include a receiving unit configured to receive, from a second device, a communication based on a short range communication protocol that includes presence information of the second device; and a managing unit configured to: determine a distance between the first device and the second device based on the presence information, determine whether a triggering event applies based on the distance between the first device and the second device to activate a notification mode change of the first device, and, responsive to a determination that the triggering event applies, change a notification mode for the first device from a first mode to a second mode.

In still another example embodiment, a method to switch modes of a first device may include: determining a distance between the first device and a predetermined person based on presence information of the predetermined person; determining, by the first device, whether a triggering event applies based on the distance between the first device and the predetermined person to activate a notification mode change of the first device; and, responsive to a determination that the triggering event applies, changing a notification mode of the first device from a first mode to a second mode that includes silencing push notifications on the first device.

In still another embodiment, a method to switch modes of a first device may include: requesting presence information of a second device from a server that includes a distance between the first device and the second device; determining, by the first device, whether a triggering event applies based on the presence information of the second device; and, responsive to a determination that the triggering event applies, changing a notification mode of the first device from a first mode to a second mode that includes silencing push notifications on the first device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
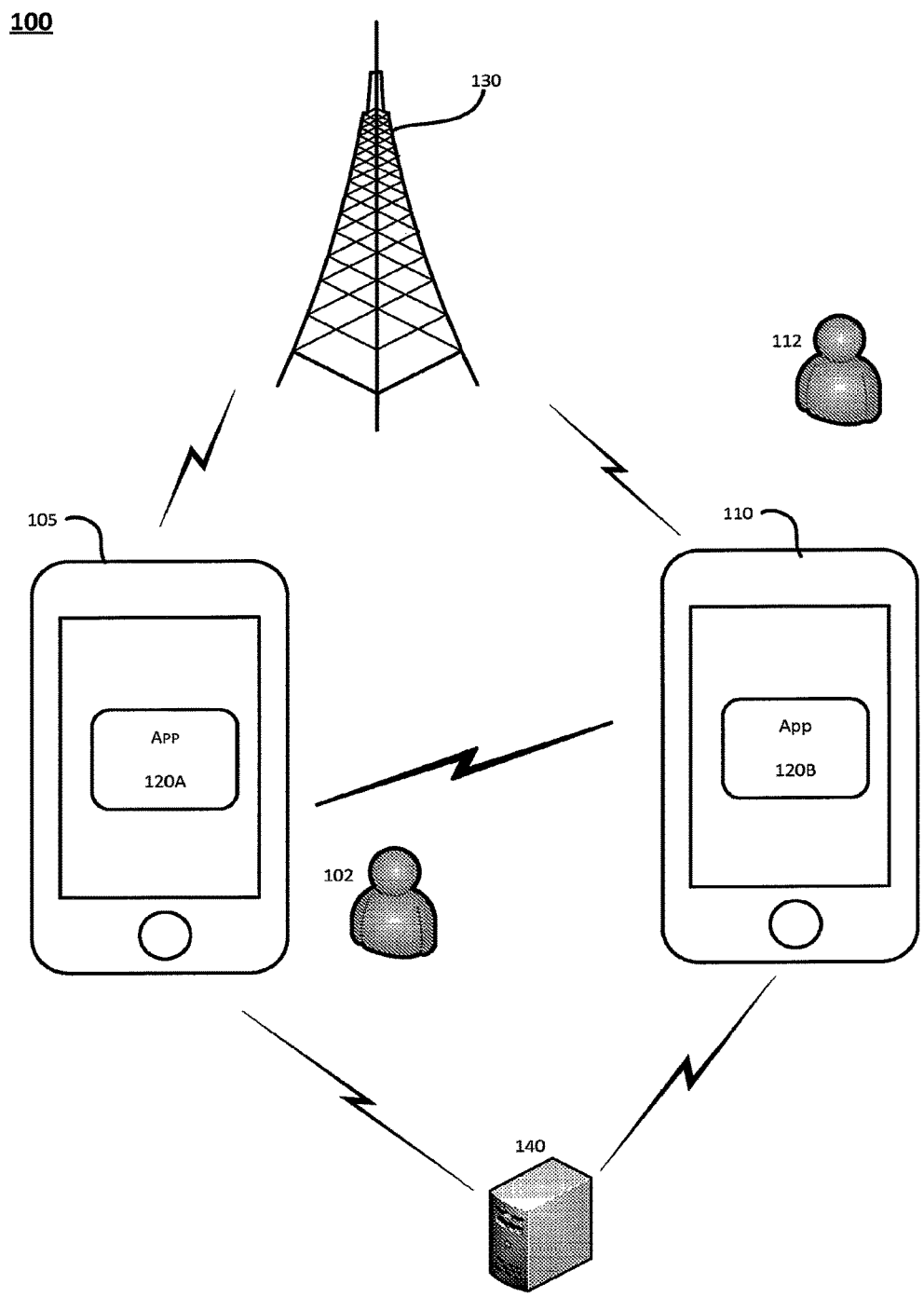
FIG. 1 shows an example system in which presence-based device mode modification may be implemented, arranged in accordance with at least some embodiments described herein.

In the following detailed description, reference is made to the accompanying drawings, which form a part of the description. In the drawings, similar symbols typically identify similar components, unless context dictates otherwise.

Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 in which presence-based device mode modification may be implemented, arranged in accordance with at least some embodiments described herein. As depicted, system 100 includes, at least, a first device 105 that may be used, operated or otherwise carried by a first user 102; and a second user 112 who may optionally carry a second device 110. First device 105 includes a first application 120A, and second device 110 includes a second application 120B. System 100 may optionally include at least one of a wireless communication base station 130 and a server 140.

First device 105 and second device 110 may respectively refer to handheld cellular telephones, e.g., smartphones, but may also refer to any wireless device that is configured to conduct presence-based device mode modification. Other non-limiting examples for at least one of first device 105 and second device 110 may include a personal digital assistant (PDA), a tablet computer, a laptop computer, a portable communication device, a wearable computing device including, for example, Google Glass' of Google® Inc.; Samsung Galaxy Gear® Smart Watch; and equivalents thereof.

Wireless communication base station 130 may refer to a base station site, which is capable of hosting multiple base stations serving multiple communication technologies. For example, wireless communication base station 130 may refer to a site at which antennae and electronic communications equipment are placed or positioned, e.g., a radio mast, tower, etc., to create a cell in a cellular network. Further, wireless communication base station 130 may facilitate presence-based device mode modification for multiple wireless communication technologies, e.g., Global System for Mobile communications (GSM), Code Division Multiple Access (CDMA), $3^{rd}$ generation (3G) mobile telecommunications technologies, $4^{th}$ generation (4G) mobile telecommunications technologies, Wireless Broadband Internet (WiBro), Mobile Worldwide Interoperability for Microwave Access (WiMAX), High Speed Downlink Packet Access (HSDPA) or the like.

Server 140, to which at least one of first device 105 and second device 110 are communicatively connected, may be implemented in accordance with any wireless network protocol, such as the Internet, a wireless network, a cellular network, a wide area network (WAN), a local area network (LAN), a virtual private network (VPN), etc.

In some example embodiments, first device 105 may be configured to detect, directly or indirectly, the presence of second user 112. Upon such detection of the presence of second user 112, first device 105 may then change a mode of operation. The detection of second user 112 by first device 105 may be referenced herein as a triggering event, and a triggering event may include either a visual or audible determination of the presence of second user 112 by first device 105. Further to the example embodiments, upon first device 105 determining that second user 112 is no more than a predetermined range or distance away, first device 105 may change its notification mode from a first mode of operation to a second mode of operation. Subsequently, upon determining that second user 112 is no longer within the predetermined range of distance, first device 105 may change its notification mode from the second mode of operation back to the first mode of operation, or even to a third mode of operation that is different from the first and second modes.

Triggering events may also include a passage of a predetermined amount of time. Thus, still further to the example embodiments, upon determining that the predetermined amount of time has elapsed since the determination that second user 112 is within the predetermined range of distance, first device 105 may change its notification mode from the second mode of operation back to the first mode of operation or to the third mode of operation.

The various notification modes to which and from which first device 105 and second device 110 may change include, but are not limited to, a normal operation mode, a selective silent mode, a meeting mode, a silent mode, etc.

Normal operation mode may refer to a notification mode by which first device 105 audibly notifies user 102 of all incoming calls, text/SMS messages, emails, reminders, etc.

Selective silent mode may refer to a notification mode by which first device 105 audibly notifies user 102 of incoming calls only.

Meeting mode may refer to a notification mode by which first device 105 audibly notifies user 102 of user-designated events, including selective phone calls, particular event reminders, etc.

Silent mode may refer to a notification mode by which first device 105 does not provide any audible notifications to user 102. The silent mode may include, in addition or as an alternative, vibrating notifications by which a respective device may vibrate as opposed to providing audible notifications.

It will be appreciated that the nomenclature for such modes, and even the types of notifications, may vary without departing from the scope of the descriptions thereof. Further, although examples provided herein pertain to changing notification mode of a device, embodiments described herein may be implemented in applications by which a different operating mode other than the notification mode of a respective device is changed based at least in part on one or more triggering events.

First application 120A may refer to an instance of an application hosted on first device 105 that may be configured, designed, and/or programmed to facilitate a change of mode of operation, notably a notification mode, for first device 105. First application 120A may include a user interface (UI) that enables user 102 to select the first notification mode, the second notification mode, and the third notification mode. The UI may further enable user 102 to define parameters of the triggering events. The user-defined parameters of the triggering events may include, as non-limiting examples, identities of people who may be regarded as second user 112, telephone numbers of people who may be regarded as second user 112, a media access control (MAC) address or an IP address of second device 110 corresponding to a person who may be regarded as second user 112, or any unique identifier of second device 110 corresponding to a person who may be regarded as second user 112. The user-defined parameters of the triggering events may further include variable periods of time or even variable times of a day at which changed modes of notification may be returned to the first notification mode, etc.

Second application 120B may refer to an instance of an application hosted on second device 110 that, similar to the instance of the application hosted on first device 105, may be configured, designed, and/or programmed to facilitate a change of mode of operation, notably a notification mode, for second device 110. Thus, second application 120B may also include a user interface (UI) that enables second user 112 to select the first notification mode, the second notification mode, and the third notification mode; and to define parameters of the triggering events. The embodiments described herein, though, pertain to a change in mode of operation, e.g., mode of notification, for first device 105, although the embodiments may be applied to second device 110, as well.

In some embodiments, first application 120A may be configured, designed, and/or programmed to detect the presence of second user 112 based on, e.g., a visual image of second user 112 captured by first device 105 and/or auditory references to second user 112. To do so, first application 120A may be further configured, designed, and/or programmed to store at least one visual image of second user 112 including, for example, a still image, e.g., a digital photograph, a still image from video file, or the video file itself.

First application 120A may be further or alternatively configured, designed, and/or programmed to access auditory references to second user 112 stored in first device 105 that may include, for example, audio files of one or more words spoken by second user 112. Thus, first application 120A may be further configured to compare voices spoken within the predetermined range of distance from first device 105 to the audio files stored in first device 105. The predetermined range of distance from first device 105 may correspond to a range of operation for a microphone for first device 105. Auditory references to second user 112 may also include, for example, generic sounds attributable to any persons determined to be within the predetermined range of distance from first device 105. Such generic sounds may indicate the presence of a person or persons, which may be defined as a triggering event for which a mode of operation may be changed. Non-limiting examples of such generic sounds may include footsteps, the sounds of a door opening and/or closing, sounds or detected frequencies indicating operation of a projector, sounds or detected frequencies indicating a phone call in progress, etc. In accordance with such embodiments, first application 120A, as well as second application 120B, may be configured, designed, and/or programmed to execute one or more known voice recognition functionalities.

In other embodiments, first application 120A may be further, or alternatively, configured, designed, and/or programmed to detect the presence of second device 110 within the predetermined range of distance by communicating, directly or indirectly, with second device 110, which may or may not host second application 120B. For example, first application 120A may recognize audible or inaudible signals generated by second device 110. By such example, first device 105 and second device 110 may communicate with each other using signals that may be audible and/or inaudible to human ears. Alternatively or in addition, first application 120A may receive global positioning system (GPS) information of second device, either directly from second device 110 or indirectly from another source of information such as, for example, wireless communication base station 130 or server 140. Alternatively or in addition, first application 120A may detect short-range communication between first device 105 and second device 110 including, e.g., Bluetooth, radio-frequency identification (RFID), WiFi, infrared and near field communication (NFC). Even further, alternatively or in addition, first application 120A may detect Indirect communication between first device 105 and second device 110 including, e.g., long-range communication via at least one of wireless communication base station 130 and server 140.

Based on the aforementioned configurations, designs, and/or programming of first application 120A, first device 105 may determine the presence as well as non-presence of any person or persons identified as second user 112 and/or the presence or non-presence of second device 110.

First application 120A may be further configured, designed, and/or programmed to receive input from first user 102 to operate passively or proactively. For example, in a passive state, first device 105 may change from one mode of operation to another mode of operation upon passively receiving indication of the presence of second user 112 and/or second device 110 within a predetermined range of distance. Alternatively or in addition, in an active state, first device 105 may actively probe and identify the presence of second user 112 and/or second device 110 within a predetermined range of distance. In some embodiments of the active state, a frequency at which first device 105 probes for the presence of second user 112 and/or second device 110 may be customized by user 102. For example, first device 105 may be configured to actively probe for the presence of known persons and/or devices every minute, every several minutes, every hour, and so on.

In some embodiments, the presence-based mode modification in a device, e.g., first device 105 or second device 110, may be determined and activated by a server, e.g., server 140. For example, server 140 may receive, from first device 105, a first communication that includes first presence information of first device 105 and receive, from second device 110, a second communication that includes second presence information of second device 110. Based on the received presence information of first device 105 and second device 110, server 140 may determine a distance between first device 105 and second device 110 and also determine whether a triggering event has occurred in view of the determined distance between first device 105 and second device 110. Server 140 may further transmit a third communication to first device 105 to activate a change in mode of operation of first device 105 from one mode to another.

Figure 2:
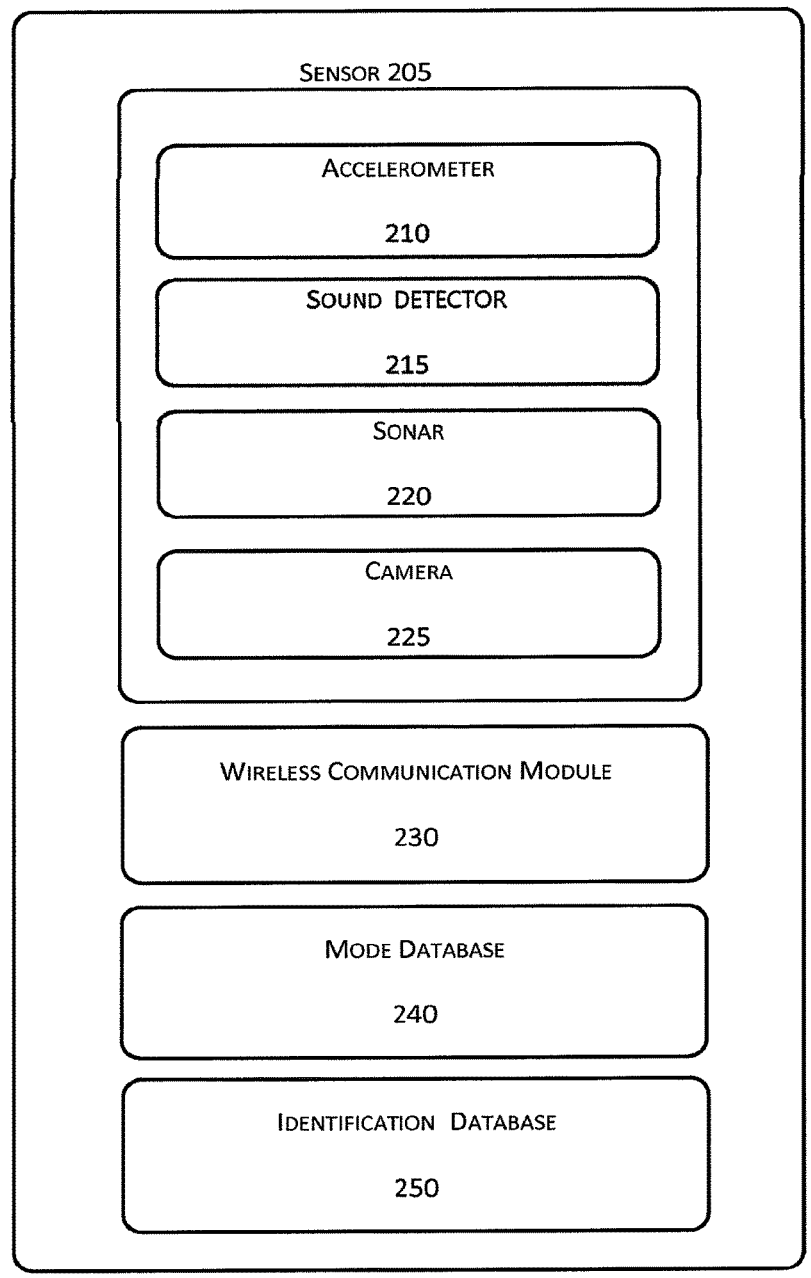
FIG. 2 shows an example configuration of a device that may implement at least portions of presence-based mode modifications, arranged in accordance with at least some embodiments described herein.

FIG. 2 shows an example configuration of a device 200 that may implement at least portions of presence-based mode modifications, arranged in accordance with at least some embodiments described herein. Device 200 may refer to either first device 105 or second device 110. As depicted, device 200 may be configured to include a sensor 205, a wireless communication module 230, a mode database 240 and an identification database 250. Sensor 205 may include one or more of, but not limited to, the following: an accelerometer 210, a sound detector 215, a sonar 220, and a camera 225.

Sensor 205 may record sensor information, e.g., visual and/or auditory information, collected, detected, captured or otherwise received by the one or more components of sensor 205. Any one or more of sensor 205, wireless communication module 230 and mode database 240, including accelerometer 210, sound detector 215, sonar 220, and camera 225, may be implemented as hardware, software, firmware, or any combination thereof.

Accelerometer 210 may refer to a component or module configured, designed, and/or programmed to sense acceleration of device 200 due to, for example, a movement of device 200 by the user thereof. For example, accelerometer 210 may detect movement of first device 105 as user 102 walks. In some embodiments, accelerometer 210 may be implemented as a three-axis accelerometer in a mobile computing device. In that regard, accelerometer 210 may utilize a same component that detects or determines the orientation of the mobile computing device to establish, for example, whether a portrait-oriented or a landscape-oriented display should be output. In other embodiments, the output of accelerometer 210 may be used to detect movement of the user of device 200 to infer that the user is no longer within a predetermined range of distance of a particular person or device and to trigger a change in mode of operation.

Sound detector 215 may refer to a component or module configured, designed, and/or programmed to detect sound of and/or sound made by any person, e.g., second user 112, and/or another device, e.g., second device 110. For example, sound detector 215 may pick up, detect or otherwise receive auditory cues from second user 112 or second device 110. In some embodiments, sound detector 215 may be implemented as a microphone.

Sonar 220 may refer to a component or module configured, designed, and/or programmed to acoustically communicate with another device. For example, sonar 220 may be implemented to communicate with another device using signals that may be audible and/or inaudible to human ears, similar to those used between two facsimile machines in communication.

Camera 225 may refer to a component or module configured, designed, and/or programmed to capture visual images of the surrounding of device 200, including images of any person and/or device within the range of imagery captured by camera 225. The range of imagery may or may not be the predetermined range in which first device 105 determines whether a person is within range of the device.

Wireless communication module 230 may refer to a component or module configured, designed, and/or programmed to wirelessly communicate with one or more external communication devices. In some embodiments, wireless communication module 230 may be implemented to communicate with one or more other devices in accordance with one or more protocols and/or technologies such as, for example, Bluetooth, RFID, WiFi, Infrared, NFC and one or more of the mobile communication standards (e.g., 3G, 4G, WiMax, LTE, LTE-Advance).

Mode database 240 may refer to a component or module configured, designed, and/or programmed to store one or more types of mode of operations that are changeable as well as a number of modes to change to and from for each type of mode of operation. Types of mode of operations may include, for example, notification mode, power saving mode, airplane mode, etc. Within the notification mode of operations, there may be, for example, a normal operation mode, a selective silent mode, a meeting mode and a silent mode.

Identification database 250 may refer to a component or module configured, designed, and/or programmed to store one or more unique identifications of one or more persons and/or one or more devices.

Figure 3:
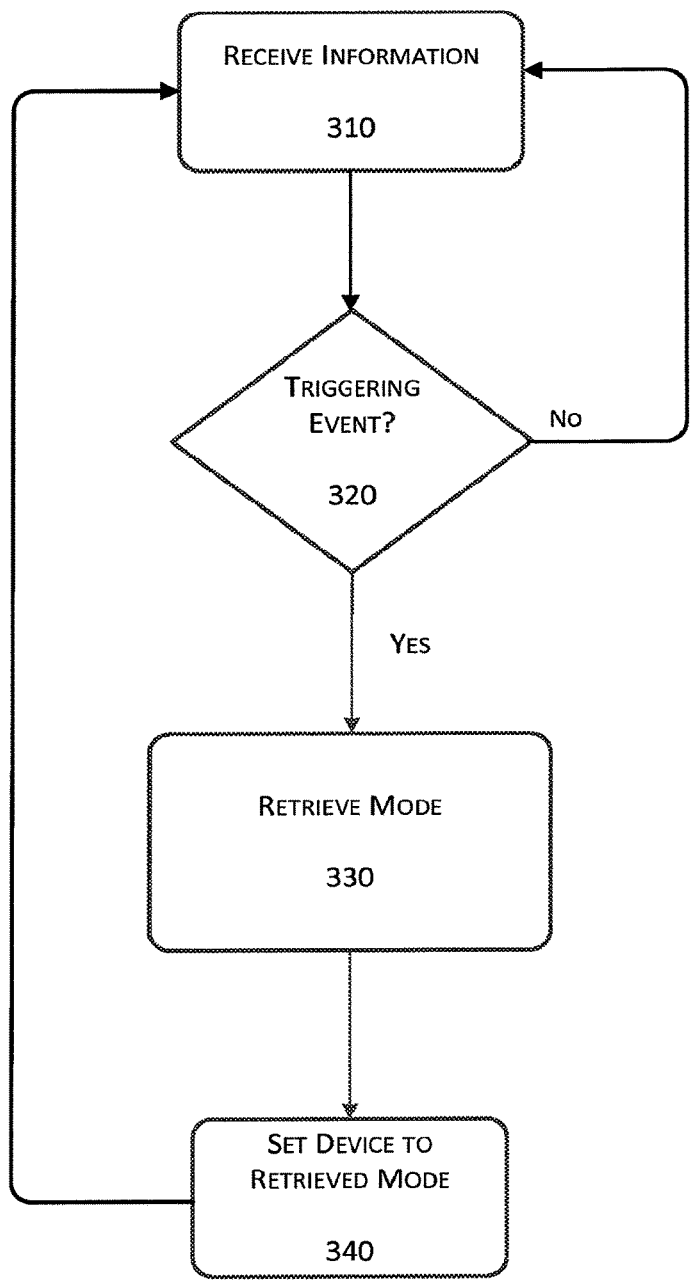
FIG. 3 shows an example processing flow by which presence-based mode modifications may be implemented, in accordance with at least some embodiments described herein.

FIG. 3 shows an example processing flow 300 by which presence-based mode modifications may be implemented, in accordance with at least some embodiments described herein. Processing flow 300 may be implemented by first device 105, second device 110, or both. Further, processing flow 300 may include one or more operations, actions, or functions depicted by one or more blocks 310, 320, 330 and 340. Although illustrated as discrete blocks, various blocks may be divided into additional blocks, combined into fewer blocks, or eliminated, depending on the desired implementation. Processing flow 300 may begin at block 310.

Block 310 (Receive Information) may refer to first device 105 receiving from second device 110 a communication, based on a short-range communication protocol that includes presence information of second device 110. In some embodiments, block 310 may refer to first device 105 receiving from server 140, e.g., via wireless communication base station 130, a communication, based on a long-range communication protocol, that includes presence information of second device 110. The receiving of presence information of second device 110 by first device 105 from server 140 may be a result of first device 105 requesting such information. The presence information may include, for example, GPS location of second device 110, auditory cues captured by first device 105 of second device 110 and/or visual or auditory information of second user 112 who is carrying second device 110.

In some embodiments, block 310 may refer to first device 105 receiving presence information of second user 112. Accordingly, the presence information may include, for example, a picture captured by first device 105 of second user 112, captured auditory cues attributable to second user 112 within a predetermined range of distance of first device 105.

In some embodiments, block 310 may refer to server 140 receiving, from first device 105, a first communication that includes first presence information of first device 105 and, from second device 110, a second communication that includes second presence information of second device 110. Block 310 may be followed by decision block 320.

Decision block 320 (Triggering Event?) may refer to first application 120A corresponding to first device 105 determining a distance between first device 105 and second device 110 and/or second user 112; and determining whether a triggering event has occurred based on a determined distance between first device 105 and second device 110 or second user 112. In some embodiments, decision block 320 may refer to server 140 determining a distance between first device 105 and second device 110, and then determining whether a triggering event has occurred based on the distance between first device 105 and second device 110. The triggering event may be, for example, the distance between first device 105 and second device 110 or second user 112 being less than or equal to a predetermined threshold distance. Additionally, the triggering event may be, for example, the distance between first device 105 and second device 110 or second user 112 being greater than or equal to the predetermined threshold distance. Upon a negative determination (i.e., "NO" at decision block 320), decision block 320 may be followed by block 310; however, upon a positive determination (i.e., "YES" at decision block 320), decision block 320 may be followed by block 330.

Block 330 (Retrieve Mode) may refer to first device 105 retrieving, e.g., from mode database 240, a second mode of operation that is different from a first mode of operation in which first device 105 currently operates. Alternatively, block 330 may refer to first device 105 retrieving, e.g., from mode database 240, the first mode of operation or a third mode of operation that is different from the second mode of operation in which first device 105 currently operates. Block 330 may be followed by block 340.

Block 340 (Set Device to Retrieved Mode) may refer to first application 120A corresponding to first device 105 changing a mode of operation, e.g., notification mode, from a first mode of operation to a second mode of operation, or from the second mode of operation back to the first mode of operation or to a third mode of operation that is different from the first and second modes. In some embodiments, block 340 may refer to server 140 transmitting a third communication to first device 105 to activate a change in mode of operation in first device 105, e.g., from a first mode to a second mode or from the second mode back to the first mode or a third mode that is different from the first and second modes.

Figure 4:
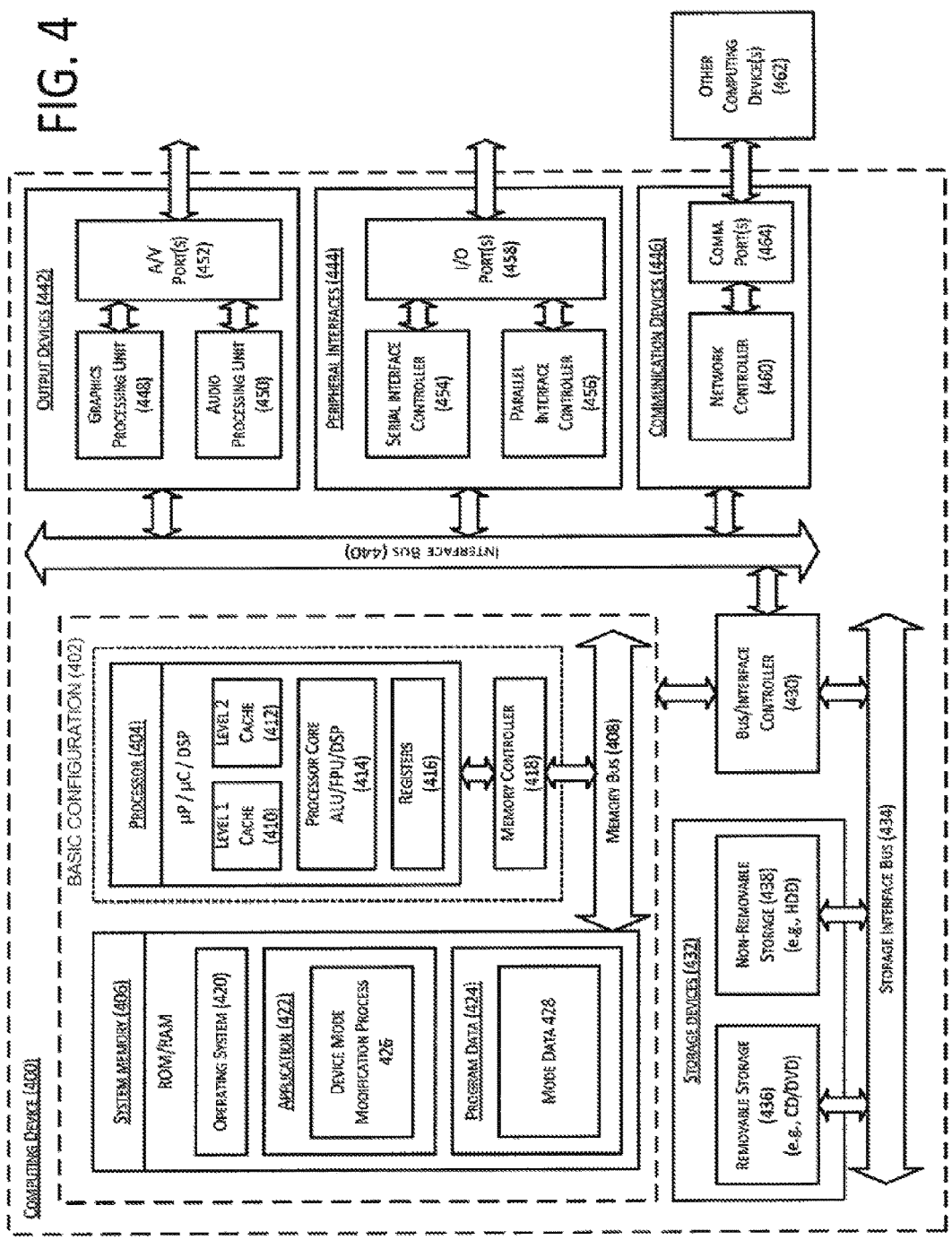
FIG. 4 shows a block diagram illustrating an example computing device by which various example solutions described herein may be implemented, arranged in accordance with at least some embodiments described herein.

FIG. 4 shows a block diagram illustrating an example computing device 400 by which various example solutions described herein may be implemented, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a device mode modification process 426 that is arranged to perform the functions as described herein including those described with respect to processing flow 300 of FIG. 3 (by, e.g., first device 105 or second device 110). Program data 424 may include mode data 428 that may be useful for operation with device mode modification process 426 as described herein. In some embodiments, application 422 may be arranged to operate with program data 424 on operating system 420 such that implementations of changing modes of operation, e.g., notification modes, may be provided as described herein. This described basic configuration 402 is illustrated in FIG. 4 by those components within the Inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a smartphone, a personal data assistant (PDA), a personal media player device, a wireless webwatch device, a personal headset device, an application specific device, or a hybrid device that include any of the above functions. Computing device 400 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital Versatile disc (DVD), a digital tape, a computer memory, etc.; and a transmission type medium such as a digital and/or an analog communication medium, e.g., a fiber optic cable, a waveguide, a wired communication link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. it will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method to change a mode of operation of a first device associated with a first user, the method comprising:
   receiving, by the first device associated with the first user, information that indicates a presence of a second user, wherein the information that indicates the presence of the second user is based at least on an audible determination of the presence of the second user, a visual determination of the presence of the second user, or a determination of a presence of a second device associated with the second user, wherein the audible determination includes:
      capturing auditory information by one or more sensors, wherein the one or more sensors include one or more microphones, and
      comparing the captured auditory information with stored audio data;
   determining, by the first device associated with the first user, based at least on the received information, whether the second user is present within a predetermined range of distance from the first device;
   identifying, based at least on the determination that the second user is present within the predetermined range of distance from the first device, by the first device associated with the first user, a triggering event that requires a change in the mode of operation of the first device from a first mode of operation to a second mode of operation; and
   changing, by the first device associated with the first user, the mode of operation of the first device from the first mode of operation to the second mode of operation based at least on the identified triggering event.

2. The method of claim 1, wherein the visual determination of the presence of the second user is based on visual information captured by the one or more sensors, wherein the one or more sensors further include one or more cameras, and
   wherein the visual determination includes comparing the visual information with stored visual data to determine the presence of the second user.

3. The method of claim 1, wherein the determination of the presence of the second device associated with the second user is based on one or more signals generated from the second device.

4. The method of claim 3, wherein the one or more signals generated from the second device include one or more signals generated from the second device and sent to the first device or sent to a third device.

5. The method of claim 1, wherein the predetermined range of distance from the first device is a range of operation of the one or more microphones of the first device.

6. The method of claim 1, wherein the receiving the information that indicates the presence of the second user includes:
   receiving, by the first device, an identification of the second user.

7. The method of claim 1, wherein the first device includes a first application, and wherein the first application receives the information that indicates the presence of the second user.

8. The method of claim 1, wherein the information that indicates the presence of the second user is received from a third device.

9. The method of claim 1, wherein the identified triggering event includes one or more user-defined parameters, and wherein the one or more user-defined parameters include one or more identifiers associated with one or more users or one or more time periods.

10. The method of claim 1, wherein the stored audio data includes generic sounds.

11. The method of claim 1,
    wherein the identified triggering event includes a predetermined period of time,
    wherein the identifying the triggering event includes determining whether the predetermined period of time has elapsed subsequent to the determination that the second user is present within the predetermined range of distance from the first device, and
    wherein the changing the mode of operation of the first device includes, responsive to the determination that the predetermined period of time has elapsed, changing, by the first device associated with the first user, the mode of operation of the first device from the second mode of operation to the first mode of operation or to a third mode of operation.

12. A first device associated with a first user, the first device comprising:
    at least one processor configured to:
       receive information that indicates a presence of a second user, wherein the information that indicates the presence of the second user is based at least on an audible determination of the presence of the second user, a visual determination of the presence of the second user, or a determination of a presence of a second device associated with the second user, wherein the determination of the presence of the second device is based on one or more signals generated from the second device;
       determine, based at least on the received information, whether the second user is present within a predetermined range of distance from the first device;
       identify, based at least on the determination that the second user is present within the predetermined range of distance from the first device, a triggering event that requires a change in a mode of operation of the first device from a first mode of operation to a second mode of operation; and change the mode of operation of the first device from the first mode of operation to the second mode of operation based at least on the identified triggering event, wherein the first device further comprises one or more sensors configured to capture auditory information or visual information and wherein the audible determination or the visual determination is based at least on the captured auditory information or visual information.

13. The first device of claim 12, wherein each of the first device and the second device is a mobile device.

14. The first device of claim 12, wherein the one or more sensors include one or more microphones configured to capture the auditory information wherein the audible determination includes comparison of the auditory information captured by the one or more microphones with stored audio data, wherein the one or more sensors further include one or more cameras configured to capture the visual information and wherein the visual determination includes comparison of the visual information with stored visual data to determine the presence of the second user.

15. The first device of claim 12, wherein the information is received from a server.

16. The first device of claim 12, further comprising:
a mode database configured to store mode of operations that includes notification mode, power saving mode, and airplane mode, wherein the notification mode includes a normal operation mode, a selective silent mode, a meeting mode, and a silent mode.

17. A non-transitory computer-readable medium hosted on a first device associated with a first user to store one or more executable instructions that, when executed, cause one or more processors to perform operations comprising:
receiving, by the first device, information that indicates a presence of a second user, wherein the information that indicates the presence of the second user is based at least on an audible determination of the presence of the second user, a visual determination of the presence of the second user, or a determination of a presence of a second device associated with the second user;
determining, by the first device, based at least on the received information, whether the second user is present within a predetermined range of distance from the first device;
identifying, based at least on the determination that the second user is present within the predetermined range of distance from the first device, by the first device, a triggering event that requires a change in a mode of operation of the first device from a first mode of operation to a second mode of operation, wherein the triggering event includes a passage of a predetermined period of time and wherein the identification includes identifying whether the predetermined period of time has elapsed subsequent to the determination that the second user is present within the predetermined range of distance from the first device;
changing, by the first device, the mode of operation of the first device from the first mode of operation to the second mode of operation based at least on the identified triggering event; and
in response to identification that the predetermined period of time has elapsed, changing, by the first device, the mode of operation of the first device from the second mode of operation to the first mode of operation or to a third mode of operation.

18. The non-transitory computer-readable medium of claim 17, wherein the identified triggering event further includes one or more identifiers associated with one or more users.

19. A method to change a mode of operation of a first device associated with a first user, the method comprising:
receiving, by the first device associated with the first user, information that indicates a presence of a second user, wherein the information that indicates the presence of the second user is based at least on an audible determination of the presence of the second user, a visual determination of the presence of the second user, or a determination of a presence of a second device associated with the second user, and wherein the visual determination includes:
capturing visual information by one or more cameras, and
comparing the captured visual information with stored visual data;
determining, by the first device associated with the first user, based at least on the received information, whether the second user is present within a predetermined range of distance from the first device;
identifying, based at least on the determination that the second user is present within the predetermined range of distance from the first device, by the first device associated with the first user, a triggering event that requires a change in the mode of operation of the first device from a first mode of operation to a second mode of operation; and
changing, by the first device associated with the first user, the mode of operation of the first device from the first mode of operation to the second mode of operation based at least on the identified triggering event.

* * * * *

UNITED STATES PATENT AND TRADEMARK OFFICE
CERTIFICATE OF CORRECTION

PATENT NO. : 9,769,311 B2
APPLICATION NO. : 15/092773
DATED : September 19, 2017
INVENTOR(S) : Shmuel Ur It is certified that error appears in the above-identified patent and that said Letters Patent is hereby corrected as shown below:

In the Specification

In Column 3, Line 34, delete "Glass' of" and insert -- Glass® of --, therefor.

In Column 9, Line 51, delete "Inner" and insert -- inner --, therefor.

In Column 10, Line 29, delete "etc)" and insert -- etc.) --, therefor.

In the Claims

In Column 13, Line 38, in Claim 1, delete "user, wherein" and insert -- user, and wherein --, therefor.

In Column 15, Line 7, in Claim 12, delete "information and" and insert -- information, and --, therefor.

In Column 15, Line 15, in Claim 14, delete "information wherein" and insert -- information, wherein --, therefor.

In Column 15, Lines 19-20, in Claim 14, delete "information and" and insert -- information, and --, therefor.

In Column 16, Line 2, in Claim 17, delete "time and" and insert -- time, and --, therefor.

Signed and Sealed this
Fifth Day of December, 2017

Joseph Matal
*Performing the Functions and Duties of the
Under Secretary of Commerce for Intellectual Property and
Director of the United States Patent and Trademark Office*